United States Patent [19]

Greiner

[11] 4,114,942
[45] Sep. 19, 1978

[54] EXPANDABLE HOUSE TRAILER STRUCTURE

[76] Inventor: Karl Walter Greiner, Steigstr. 48, D-7321 Aichelberg, Germany

[21] Appl. No.: 733,984

[22] Filed: Oct. 20, 1976

[30] Foreign Application Priority Data

Oct. 20, 1975 [DE] Fed. Rep. of Germany ....... 2546959

[51] Int. Cl.² .............................................. B60P 3/32
[52] U.S. Cl. .................................... 296/23 G; 52/66; 296/26
[58] Field of Search ................ 296/23 C, 23 F, 23 G, 296/26, 27; 52/66, 67, 69

[56] References Cited

U.S. PATENT DOCUMENTS

| 2,904,850 | 9/1959 | Couse | 296/26 |
| 3,070,399 | 12/1962 | Bartlett | 296/26 |
| 3,351,373 | 11/1967 | Christin | 296/26 |
| 3,556,581 | 1/1971 | Silva | 296/27 |
| 3,740,088 | 6/1973 | Ratcliff | 296/26 |
| 3,838,880 | 10/1974 | Lefebure | 296/23 G |
| 3,866,365 | 2/1975 | Honigman | 52/66 |
| 4,017,116 | 4/1977 | Hulsey | 296/26 |

FOREIGN PATENT DOCUMENTS

| 858,592 | 11/1940 | France | 296/26 |
| 2,236,923 | 2/1974 | Fed. Rep. of Germany | 296/26 |

Primary Examiner—Joseph F. Peters, Jr.
Assistant Examiner—John A. Carroll
Attorney, Agent, or Firm—Edwin E. Greigg

[57] ABSTRACT

A shell structure is pivoted outwardly of a house trailer to enlarge the floor area. The shell structure can include three sides positioned over a cabin or portion of a cabin, and the shell structure is pivotal about a horizontal axis near the level of the floor of the cabin which is mounted on the trailer frame. When pivoted outwardly, a folding slidable or extensible roof can be positioned on the upper edges of the shell structure.

5 Claims, 5 Drawing Figures

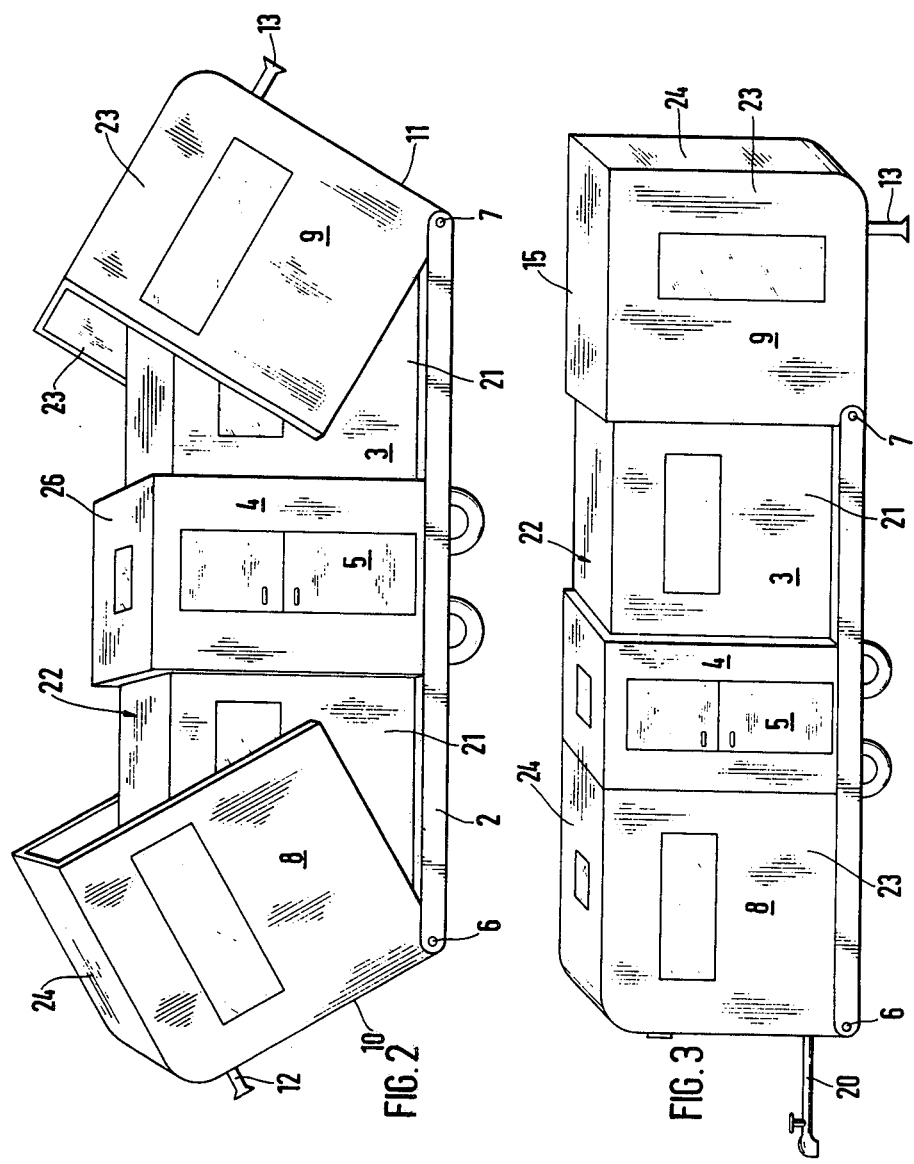

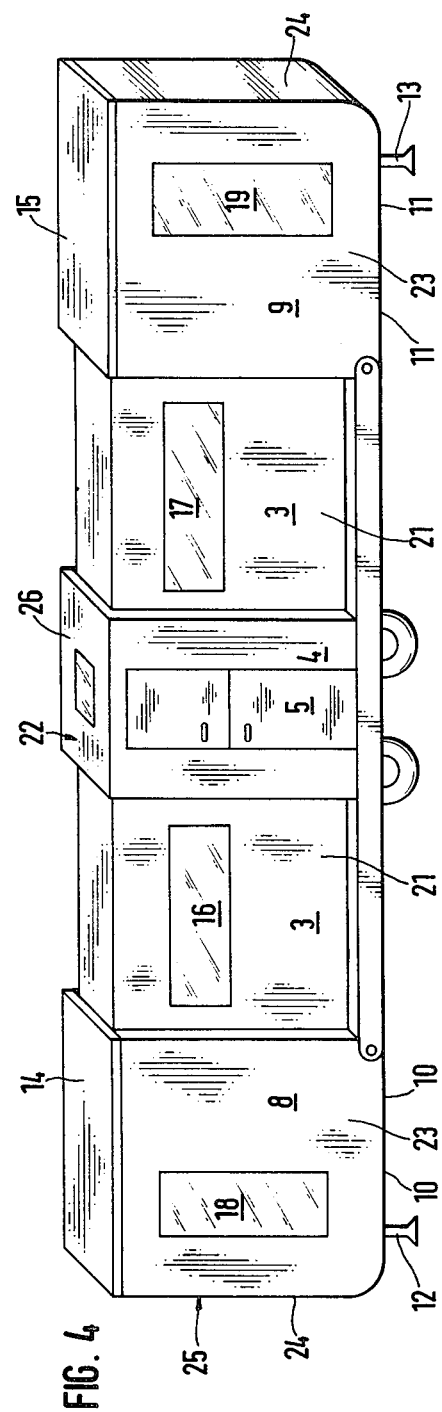
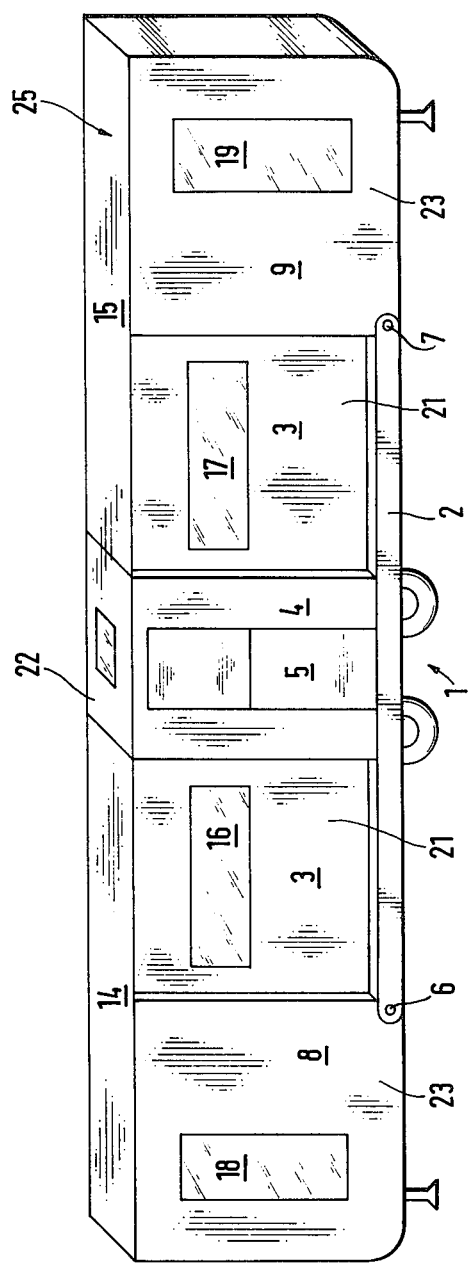
FIG. 4.
FIG. 5

EXPANDABLE HOUSE TRAILER STRUCTURE

BACKGROUND OF THE INVENTION

The present invention relates to a vehicle structure, preferably a house trailer with an enlargeable floor area.

OBJECT AND SUMMARY OF THE INVENTION

The object of the invention is to design a structure whose floor area can easily, readily and rapidly be enlarged and also reduced and which is suitable for many applications but more particularly for camping purposes.

Another object of the invention is to design a structure of this type which can be readily so constructed that even when it is in the state in which its floor area is smallest, its inner space can be used, preferably for living purposes.

Another object of the invention is to produce a structure of the type defined initially which is waterproof in every adjustment state, which allows the vehicle to be driven safely and with ease and which also enables furniture and fittings to be rigidly secured.

The vehicle structure according to the invention is characterized by a shell structure designed to be pivoted outwards from a first position in which it engages on three sides from above about a fixed structural part, about 90° about a horizontal pivot axis, into a second position in which it increases the floor area of the unit.

This shell structure can be relatively short by comparison with the total length of the vehicle. It can be handled simply and with ease and can be readily constructed in a stable and waterproof manner. It can be mounted as desired.

The unit is intended for living purposes but can also be used for camping purposes. Items of furniture such as closets, beds, seats, cooking stoves, refrigerators, etc. can be permanently installed in the fixed structural part. Pieces of furniture can also be rigidly mounted in the shell structure as long as they do not prevent the shell structure from being moved into its first position.

In the first pivot position of the structure the floor of the shell structure forms an upright outer wall of the structure, namely a front wall or a side wall depending on whether the pivot axis is at right angles to or parallel to the direction of travel of the vehicle. This pivot axis is preferably disposed at right angles to the direction of travel.

The horizontal pivot axis of the shell structure is preferably disposed at the floor level of the fixed structural section and the individual elements of the pivot bearing can either be mounted on the fixed structural part or on the chassis.

Shell sections can preferably be provided on two opposite sides of the fixed structural part. In their first position these shell sections preferably rest on one another or on the fixed structural part, preferably by way of sealed surfaces, thus avoiding the penetration of water and dirt.

According to the invention it is readily possible for the side walls of the shell structure in its second position to possess the same height or approximately the same height as the fixed structural part such that the maximum inner space has a uniform or generally uniform roof height throughout.

The side of the fixed structural part facing towards the inner space in the second position of the shell structure is preferably open or equipped with a door so that the maximum inner space of the structure is fully accessible. If this side of the fixed structure is open it is still possible for items of furniture secured to the bottom of the shell structure to penetrate the inner space of the fixed structural part without coming into contact with anything when the shell structure is converted from the second position into its first position. As a result, permanently secured furniture items of this type are arranged in a space-saving manner when the vehicle is being operated.

The vehicle is preferably a trailer but it can also be a selfpropelled vehicle, preferably a dormobile or camper. It is also possible to releasably mount the structure on the bed of a self-propelled vehicle so that it can possibly also be removed from the vehicle and set up separately.

The unit can also be used for purposes other than living such as an exhibition or demonstration vehicle or the like. However, the unit is preferably used for living purposes. The side walls and the base of the shell structure and the fixed structural part are advantageously made of rigid material and the walls can be equipped with windows and/or at least one door. The roof of the fixed structural part can be rigidly connected to the side walls thereof and it may form a unitary part with the side walls.

In its second position the shell structure is preferably equipped with a movable or removable roof. The upper edges of the side walls of the shell structure and the adjacent roof of the fixed structural part can form reliable supports for such a roof which can be constructed in many ways and which can be secured by suitable connecting means. The upper cover for the shell structure in its second position is preferably formed by the shell structure and the roof of the fixed structural part acting as a support for a corresponding folding, sliding or extensible roof.

The shell structure can easily be pivoted manually. For example, handles can be provided for this purpose on the shell structure. Alternatively, a hydraulic motor can be used for this purpose preferably a bilaterally acting piston-cylinder unit which is both hinged to the chassis, the fixed structural part and to the shell structure; the hydraulic fluid preferably being supplied via a hand pump. Other pivot means such as winches, etc., can also be provided.

Instead of providing the shell structure with solid walls, in some cases it can be equipped with a frame on which covers or tarpaulins are attached. These tarpaulins do not have to be removed when the vehicle is being driven.

In its first position the shell structure also provides protection for the fixed structural part which is preferably a cabin or cabin section— both when the vehicle is in the driving state and the live-in state. In the latter case the shell structure also provides burglary protection, soundproofing, a light shield and/ or heat protection. The protection afforded can be further improved by providing a space between the wall of the shell structure and and the wall of the fixed structural part which it covers. This space may be in communication with ventilation holes or ventilators which are preferably forwardly disposed as viewed in the direction of travel.

The shell structure may be equipped with connections for tent supports if so desired.

If, in the first position of the shell unit or units, the fixed structural part has outer wall zones which are not covered by said unit or units, for both climatic reasons and for stability, these outer wall zones can be thicker or made of a more resistant material than the wall parts of the fixed structural part which are covered by the shell structure or structures in the first position thereof.

The shell unit can be supported in its first position on the fixed structural part and/or on the chassis. It is particularly advantageous for all of the free edges of the shell structure to include sealing surfaces in both its first and second positions so as to ensure that it is sealed with respect to dirt and water in these positions. This is particularly important when the vehicle is being driven. The lower edges of the shell structure can be supported via sealed surfaces on rails provided on the plank bed of the vehicle. The first and/or second position of the shell structure may be engaged by means of securing means.

The hinges provided to enable the shell structure to be pivoted are advantageously equipped with cotter pins, thereby allowing the hinges to be disengaged and the shell structure to be completely removed. The shell structure may, for example, be used as a garage by placing it on the ground and using its base as the roof of the garage. The shell structure can also be mounted on the fixed structure to form a roof platform.

Other objects, features and advantages of the present invention will be made apparent in the following detailed description of a preferred embodiment of a mobile home or demonstration vehicle according to the invention provided with reference to the accompanying drawings.

BRIEF DESCRIPTION OF THE DRAWINGS

FIG. 2 shows the vehicle according to FIG. 1 with semi-open shell sections.

FIG. 3 shows the vehicle according to FIG. 1 with one of the two shell sections arranged on each of the two sides in the pivoted down position.

FIG. 4 shows the vehicle according to FIG. 1 in which the shell section on both sides have been pivoted down.

FIG. 5 shows the vehicle according to FIG. 4 but with a different roof.

DESCRIPTION OF THE PREFERRED EMBODIMENT

Figure 1:
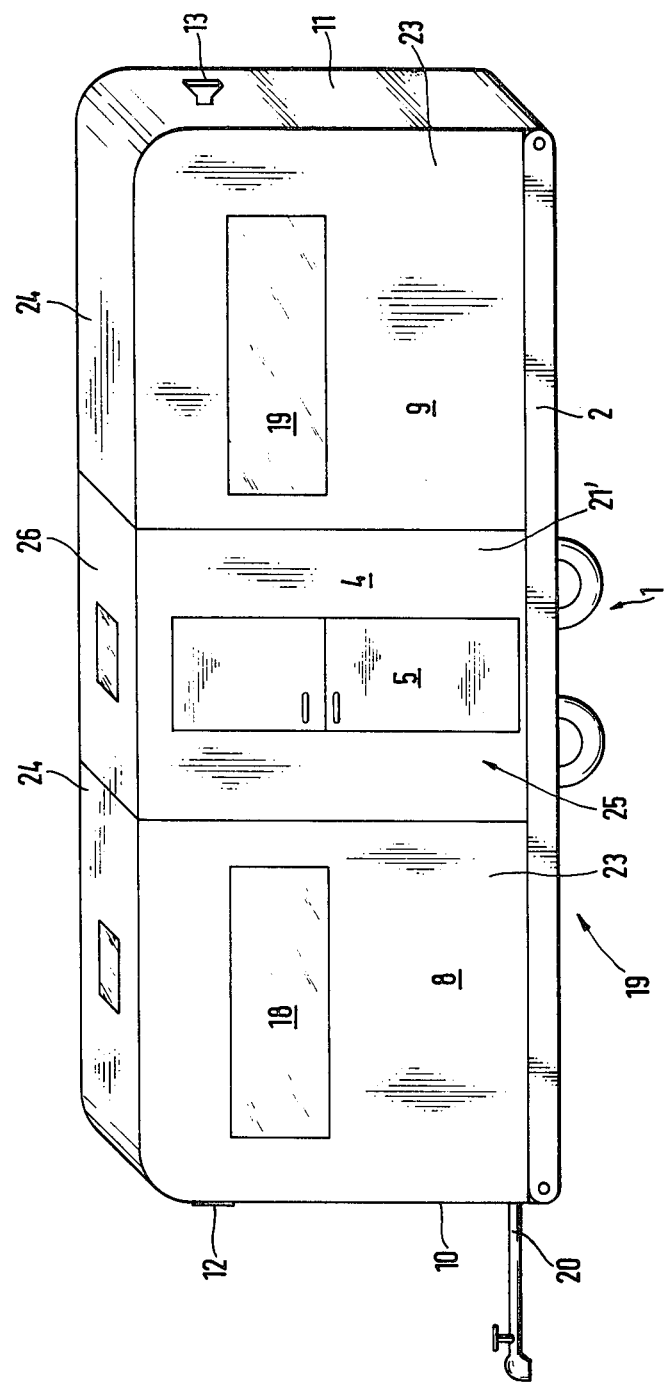
FIG. 1 shows a vehicle with fastened down (closed) shell sections.

In FIGS. 1–4, 1 designates a chassis and 2 the bed of a trailer 19, more particularly, of a mobile home trailer. A towbar 20 is attached to the frame of the trailer bed. A cabin 3 (FIG. 2) comprising a rigid floor, side walls 21 and roof 22 recessed in is central portion is mounted on the bed 2. The cabin 3 forms the rigid structural part of the trailer home.

As is more apparent in FIGS. 2 and 4, a U-shaped intermediate element 4 is mounted on the cabin 3 and is connected to the wall of the cabin 3 which it also reinforces. Thus the walls of the cabin 3 can be made of relatively thin, e.g., light material. A door 5 is mounted on the intermediate element 4 which thus provides a door frame. Inside the cabin 3 heavy articles of furniture can be secured to the intermediate element 4 such that the remaining side wall of the cabin 3 can be made of relatively lighter gauge material.

The trailer bed 2 is designed to extend beyond the cabin 3 on the two longitudinal sides thereof and it supports both the intermediate element 4 and the hinges 6, 7 at the two ends. The shell sections 8 and 9 are pivotably mounted by way of the hinges 6 and 7 about a horizontal axis disposed at right angles to the longitudinal direction of the bed 2.

Retractable supports 12 and 13 are mounted on the walls of the shell sections 8 and 9 serving as the floor sections 10 and 11. These supports are used to support the floors 10 and 11 on the ground when the shell sections 8 and 9 are in the pivoted - down position.

FIG. 2 shows the shell structures 8 and 9 during the pivoting movement. In the pivoted-down state (FIG. 4) roofs 14 and 15 are removably disposed on the living space of the structure 25. The roofs are possibly supported at the upper edges of the three side walls of the shell sections 8 and 9 and at the roof of the cabin 3 by way of a seal (not shown).

The roofs 14 and 15 can also be in the form of folding roofs, extensible or siding roofs. In the embodiment shown in FIG. 5 the roofs 14,15 of the shell structures are extended as far as the intermediate element 4, thereby forming a continuous level roof. In the case of a folding roof the idea is to automatically insert the roof surfaces in a cavity provided between the front walls or front sides of the cabin 3 and the bases 10,11 when the front walls or front sides of the cabin 3 and the bases 10,11 when the sections 8 and 9 are being closed. Extensible or retractable drainage means project over the lateral upper edges of the shell sections 8 and 9 at the longitudinal sides of the folding roof.

As also shown, openings 18 and 19 (FIG. 1) which correspond to the window openings 16 and 17 and which are arranged over them in the closed position, are provided on the shell sections 8 and 9. In the pivoted-out position these openings 18,19 advantageously serve as doors or windows.

FIG. 3 also shows how the shell section 8 can provide protection from external influences for the bedroom disposed on this side of the cabin 3 and if the shell section 8 does not possess a window it can serve to black out the window in the cabin 3 which it covers. It can also provide protection from burglaries. The same can apply to the other shell section 9.

The shell structures 8 and 9 according to the invention can also be readily mounted on vehicles.

In the driving state of the structure 25 (FIG. 1) the outer faces of the longitudinal side walls 23 and those of the front walls 24 of the shell structures 8, 9 which then form the rooves are aligned with the adjacent outer faces of the longitudinal side walls 21' and of the roof 26 of the intermediate element 4, thereby avoiding any air resistances at the impact points and ensuring that the trailer has minimal air resistance.

In the pivoted-out second position of the shell structures 8,9 the latter are advantageously sealed by means of sealing faces with respect to the wall of the cabin 3. The seals can, for example, be disposed on flanges provided on the outside of the cabin 3.

The rigid structural part 3 can contain at least one laterally extensible part in the form of a box which is open on the side facing towards the part 3 if it is wished to further increase the floor area of the structure.

What is claimed is:

1. A housing structure convertible between smaller and larger living areas comprising:
   a base support frame;
   a cabin having a floor, ceiling and side walls secured to said base support frame and having a U-shaped member contacting and overlying the ceiling and adjoining side walls defining a flat shoulder or abutment facing one edge of said cabin;

a four sided shell member pivotally mounted to said frame adjacent one end of said cabin or an axis transverse to a longitudinal axis of said cabin, said shell in closed position enclosing said one end, ceiling and side walls of said cabin with its edges remote from the pivot point engaging said flat shoulder and defining therewith a smooth uninterrupted exterior surface, said shell in an open position rotated 90° from its closed position forming an extension of the living area in said cabin; and a separable roof member positionable to form a roof over said shell in its open position.

2. A housing structure as defined by claim 1 including at least one window in at least one side wall of said cabin;
said shell including at least one window in one of its side walls, so positioned as to register with said cabin window when said shell is in closed position.

3. A structure as defined by claim 1 in which said base support frame is mounted on wheels so as to form a trailer.

4. A structure as defined by claim 1 including a door in said U-shaped member opening into said cabin.

5. A structure as defined by claim 1 including a second shell member identical to the first and pivotally mounted to said frame at the opposite end thereof.

* * * * *